United States Patent [19]

Brisabois

[11] 4,289,045

[45] Sep. 15, 1981

[54] HOUSINGS OF GEARBOXES FOR POWER UNITS

[75] Inventor: Roger Brisabois, Clamart, France

[73] Assignee: Regie Nationale des Usines Renault, Boulogne-Billancourt, France

[21] Appl. No.: 873,575

[22] Filed: Jan. 30, 1978

[30] Foreign Application Priority Data

Jan. 31, 1977 [FR] France .............................. 77 02560
Sep. 14, 1977 [FR] France .............................. 77 27809

[51] Int. Cl.$^3$ ...................... F16H 37/08; F16H 57/02
[52] U.S. Cl. .................................... 74/701; 74/606 R
[58] Field of Search ..................... 74/606 R, 695, 700, 74/701

[56] References Cited

U.S. PATENT DOCUMENTS

| | | | |
|---|---|---|---|
| 2,038,326 | 4/1936 | Wagner ................................ | 74/700 |
| 3,550,474 | 12/1970 | Maurice et al. ................... | 74/606 R |
| 3,636,795 | 1/1972 | Maurice et al. ................... | 74/606 R |
| 3,703,107 | 11/1972 | Piret ...................................... | 74/701 |
| 4,056,988 | 11/1977 | Kubo et al. ........................... | 74/695 |
| 4,095,487 | 6/1978 | Cartwright et al. ................. | 74/695 |
| 4,174,644 | 11/1979 | Nagy et al. .......................... | 74/701 |

*Primary Examiner*—Kenneth J. Dorner

*Attorney, Agent, or Firm*—Beveridge, DeGrandi, Kline & Lunsford

[57] ABSTRACT

A transmission unit for coupling the engine of a motor vehicle to either a manual-shift gearbox or an automatic gearbox includes a differential having a crown gear, pinions for coupling the crown gear to the output shaft of the gearbox and a housing for enclosing the differential, the pinions, and either a mechanical clutch or a torque converter. The housing has a first coupling face portion for attaching the transmission unit to an engine, a second coupling face portion for attaching the transmission unit to a manual-shift gearbox or to an automatic gearbox, and bearings supported to engage the pinion and the input and output shafts of the engine, the gearbox and the differential, with the gearbox of either shafts in substantially the same position relative to the housing. The housing can be a one-piece construction or a two-piece construction. A bearing support housing can be utilized with the main housing when coupling the transmission unit to an automatic gearbox. The pinions can include a two-part pinion with different sets of teeth. Bearing members can mount the pinions on shafts of the housing and might include tapered roller bearings, needle bearings, ball bearings, cylindrical roller bearings, or a combination of these.

30 Claims, 9 Drawing Figures

HOUSINGS OF GEARBOXES FOR POWER UNITS

The present invention pertains to the construction of power unit assemblies which can be disposed transversely in self-propelled vehicles, while enabling utilization of either a manual-shift gearbox or an automatic gearbox.

Motor vehicles generally are equipped either with a transmission of the manual-shift type or with a transmission of the automatic type. The various elements constituting the transmissions of the two types are, in fact, different, not only as regards the space the transmissions require, but also as regards the position of the input and output shafts. As a consequence, numerous components of motor vehicles must be of different designs in vehicles fitted with transmissions of the two different types. The adoption of one specific design for use with manual-shift transmissions and of another specific design for use with automatic transmissions necessitates providing special transmission shafts and special surrounding components for each of the two transmission types. All these differences likewise have the consequence that it is necessary to provide a greater number of different parts, both during assembly and also as spare parts, whence arises a considerable increase in the investment costs.

The present invention has as its object the providing of a transmission which is suited for mounting transversely in a motor vehicle and which is able to utilize, substantially without modification, either a manual-shift gearbox or an automatic gearbox. In this way, the vehicle transmission can benefit from the reduced costs which derive from manufacture in larger production runs. The transmission is particularly suited for use with an engine and differential all mounted transversely, for example in a front wheel drive automobile having the engine, transmission and differential aligned at the front of the vehicle, transverse the vehicle longitudinal axis, or in a rear wheel drive vehicle having those powertrain components at the rear of the vehicle aligned transverse the vehicle longitudinal axis.

The transmission according to the invention is adapted to be disposed transversely and to utilize either a manual-shift gearbox or an automatic gearbox. The transmission includes a housing which is common to the two versions, manual-shift and automatic. In the manual-shift version the transmission includes a mechanical clutch, a manual-shift gearbox, a control pinion for the crown gear of a differential, and a differential. In the automatic version the transmission includes a hydrokinetic torque converter, an automatic gearbox, a motion output pinion of the automatic gearbox, an intermediate pinion, and a differential with its gear crown.

The common housing may be of a one-piece design or in two parts and can be mounted, without any modification in the manual-shift version or in the automatic version, by one of its faces on the motor. In the case where the common housing is of a one-piece design, it can receive, on a face which is parallel and opposed to the face by which it is connected to the motor, either a manual-shift gearbox housing in the manual-shift version, or, by the instrumentality of a bearing support housing in the automatic version, an automatic gearbox housing. In the case where the said common housing is in two parts, it can receive, on a face which is parallel and opposed to the face used for coupling to the motor, either a manual-shift gearbox mechanism or an automatic gearbox mechanism and an internal bearing support housing.

The above-mentioned intermediate pinion, in the automatic version, which connects the motion output pinion of the automatic gearbox and the crown gear of the differential, is a pinion in two parts. These two parts can have identical teeth, but can advantageously each have their own teeth, different from those of the other.

The common housing includes support means which are suitable, in the manual-shift version, for mounting a bearing for the primary shaft of the manual shift gearbox and, in the automatic version, for mounting a bearing for the motion output pinion of the automatic gearbox. The common housing additionally includes support means suitable, in the manual-shift version, for mounting a bearing for the drive pinion of the differential, and, in the automatic version, for mounting a bearing for the intermediate pinion. The common housing further includes support means suitable for mounting two bearings for the differential.

The positions of the shafts of the transmission in accordance with the invention are identical in the manual-shift version and in the automatic version.

The transmission according to the invention permits the use, in the manual-shift version and in the automatic version, of an identical differential box and an identical differential crown.

The present invention has the advantage of utilizing a design which makes use of a common housing, in one or two parts according to the embodiment chosen, to be fixed on the motor and to have fixed on it either the manual-shift gearbox housing or the automatic gearbox mechanism housing, the latter entailing the mounting of an intermediate bearing support housing or of an internal bearing support housing. The space requirements for the manual-shift transmission and for the automatic transmission are substantially equivalent. The positions of the output shafts are identical. The automatic transmission of the present invention includes a staggered gear train, giving the advantage of having a differential which is identical in the automatic version and in the manual-shift version. Moreover, this staggered gear train has the advantage of making possible very great ranges of speed ratio. All these resulting characteristics permit a considerable reduction in investment and in the number of types of spare parts, and enable the transmission to benefit, for all the parts which are common to the manual-shift version and the automatic version, from the cost advantages of very large production runs.

The invention will be better understood by reference to several embodiments which are described, by way of example without in any way introducing limitations thereby, and which are illustrated by the drawings, in which.

Figure 1:
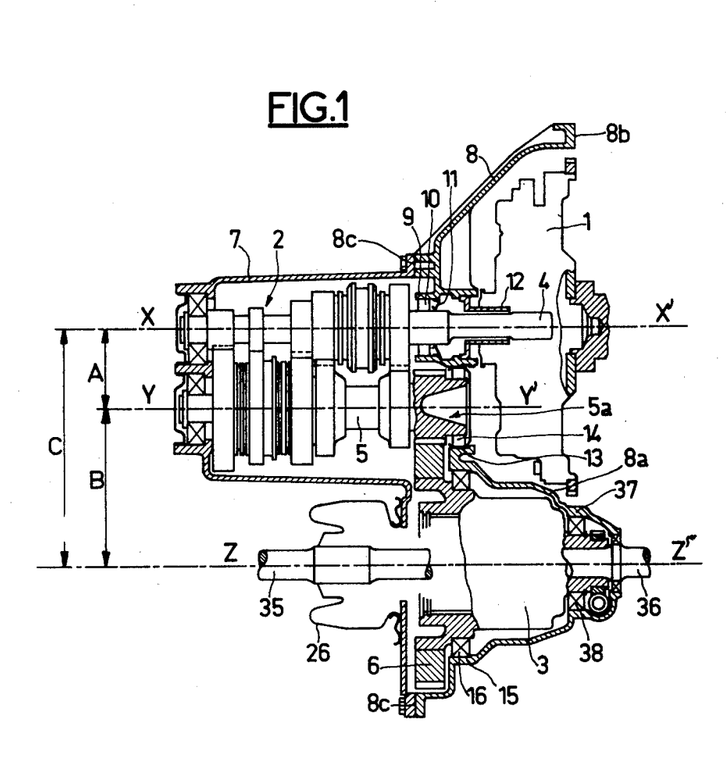
FIG. 1 shows a sectional view of a transmission according to the invention, with a common, one-piece housing, in the manual-shift version.

FIG. 1 shows a transverse transmission of the manual-shift type, comprising a clutch 1, a manual-shift gearbox mechanism 2 and a differential 3. The manual-shift gearbox mechanism includes a primary shaft 4 and a secondary shaft 5, which respectively carry pairs of pinions that permit different transmission ratios. The primary shaft 4 is coaxial with the motor shaft and is connected to the motor shaft by the friction clutch 1. The secondary shaft 5 carries a straight-tooth pinion 5a which meshes with the crown gear 6 of the differential 3. This manual-shift gearbox mechanism 2 is contained within a mechanism housing 7.

A common housing 8, which plays the part of a gear train housing, encloses the clutch 1, the pinion 5a, the toothed crown 6 and the differential 3. The common housing 8 includes a support 9 for a roller bearing 10 engaging the primary shaft 4. Support 9 is provided with sealing joint 11 and a stop-carrier support 12. The common housing 8 also includes a support 13 for a roller bearing 14 engaging the secondary shaft 5 and the pinion 5a. Bearing 14 supports a part of the radial thrust developed by the pinion 5a which meshes with the crown gear 6 of the differential 3. The common housing 8 further includes a support 15 for a ball bearing 16 and a support 37 for a ball bearing 38, the two bearings 16 and 38 engaging the differential 3. The common housing 8 includes a wall 8a which permits the components of clutch 1 to be separated in a sealed manner from the rest of the transmission, that is, from the gearbox-differential mechanism assembly.

The common housing 8 also fulfills the function of a bridge housing. The common housing 8 has two coupling faces 8b and 8c. When the transmission is installed, face 8b is attached directly to the motor housing, and the housing 7 of the manual-shift gearbox 2 is attached to the face 8c, which is parallel and opposed to the face 8b.

Figure 2:
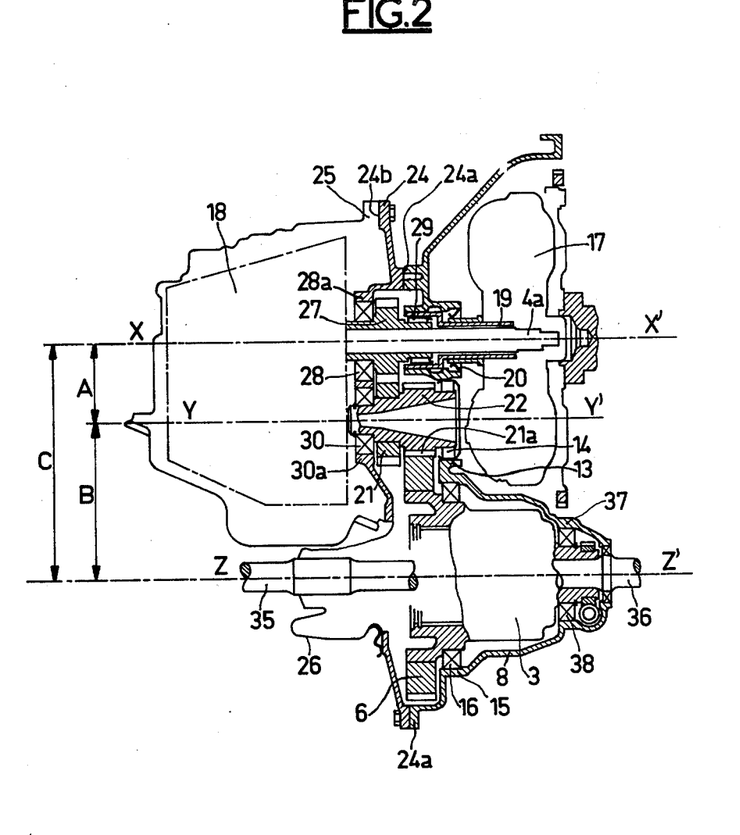
FIG. 2 shows a sectional view of a transmission according to the invention, with a common, one-piece housing, in the automatic version.

FIG. 2 shows a transverse transmission of the automatic type, comprising a hydrokinetic torque converter 17, an automatic gearbox mechanism 18, a gear train, and the differential 3. The automatic gearbox mechanism 18 is contained in a mechanism housing 25. The housing 8 which encloses the hydrokinetic torque converter 17, the gear train and the differential 3 is identical to the common housing 8 utilized in the manual-shift transmission type, as described with reference to FIG. 1, and is attached to the motor in the same manner. The common housing is designed such that it is able to enclose the hydrokinetic torque converter 17. Support 9, which in the manual-shift type shown in FIG. 1 encloses the roller bearing 10, the sealing joint 11, and the stop-carrier support 12, is also designed to enclose a reaction support 19 and a sealing joint 20 in the automatic type, shown in FIG. 2. The gear train includes a pinion 27 of the automatic gearbox, coaxial with the input shaft 4a of the automatic gearbox and meshing with an intermediate pinion 22 which has two sets of teeth 21 and 21a. Teeth 21 of intermediate pinion 22 mesh with pinion 27, while teeth 21a mesh with the crown 6 of the differential 3. Support 13 thus retains the bearing 14, already utilized and described in FIG. 1. Bearing 14 takes up a part of the radial thrust developed by the intermediate pinion. The output pinion 27 of the automatic gearbox is centered within the reaction support 19 by means of a bushing 29. As in the case of FIG. 1, support 15 retains the ball bearing 16 and support 37 retains the ball bearing 38, the two bearings 16 and 38 engaging the differential 3.

In the embodiment of FIG. 2, the automatic gearbox 18 is fixed on the common housing 8 by means of an intermediate bearing-support housing 24 which includes two coupling faces 24a and 24b. Face 24a is attached to the face 8c of common housing 8, and the automatic gearbox mechanism 25 and a transmission bellows 26 are attached to the face 24b.

Bearing-support housing 24 includes a support 30a for a bearing 30 which takes up a part of the radial thrust developed by the intermediate pinion 22. The bearing-support housing 24 moreover includes a support 28a for a bearing 28 which takes up a part of the radial thrust developed by the motion output pinion 27.

The intermediate pinion 22, with two different sets 21 and 21a of teeth which mesh with the motion output pinion 27 and with the toothed crown 6 of the differential 3, permits the speed ratio between the pinion 27 and the crown 6 to be varied very considerably. In this FIG. 2, the pinion 22 is situated between the common housing 8 and the intermediate housing 24.

Figure 3:
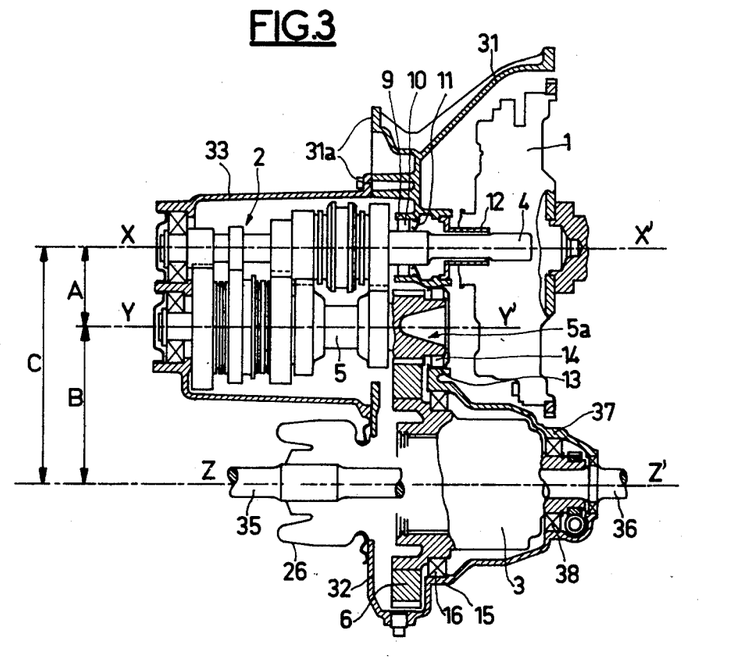
FIG. 3 is a view analogous to that of FIG. 1, showing, in the manual-shift version, a common housing in two parts, the joint plane passing through the axis of the differential.

FIG. 3 shows a transverse transmission of the manual-shift type, similar to that shown in FIG. 1. The common housing is no longer a one-piece unit, as in FIG. 1, but is in two parts comprising the common housing proper 31 and the common cover 32. The coupling face of these two parts 31 and 32 passes through the axis ZZ' of the differential 3. There is fixed on the face 31a of the common housing 31 a manual gearbox mechanism housing 33, which no longer comprises a part forming a cover, as in the manual gearbox mechanism housing 7 of FIG. 1. The said common housing in two parts includes a support for the transmission bellows 26.

Figure 4:
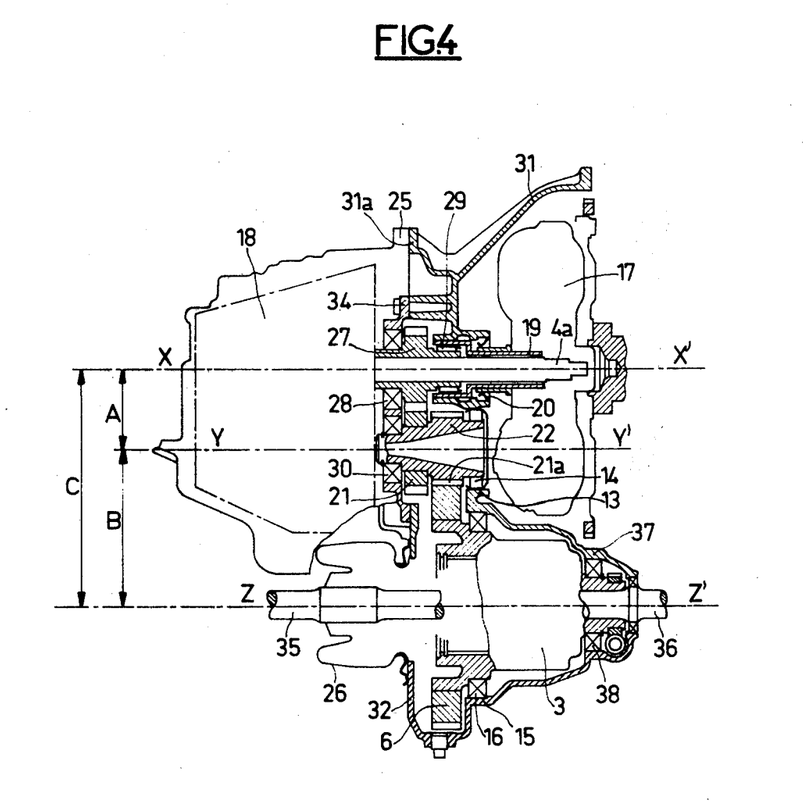
FIG. 4 is a view analogous to FIG. 2, showing, in the automatic version, a common housing in two parts, the joint plane passing through the axis of the differential.

FIG. 4 shows a transverse transmission in the automatic version, similar to that shown in FIG. 2. The common housing is in two parts 31 and 32, identical to those of FIG. 3. A bearing-support housing 34 is fixed on the face 31a of the common housing 31 on which was fixed the manual shift gearbox housing as shown in FIG. 3. This bearing-support housing 34 comprises supports for bearings having the same function as those described with reference to FIG. 2. In this embodiment, the bearing-support housing 34 is no longer interposed between the common housing and the automatic gearbox; the automatic gearbox housing 25 is, instead, fixed directly onto the face 31a of the common housing 31.

Figure 5:
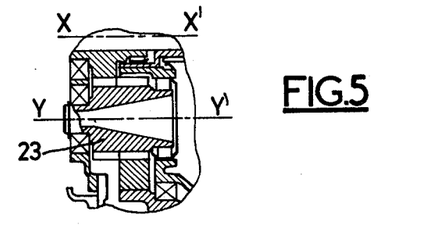
FIG. 5 shows a sectional view of a mounting of the double-width intermediate step-down pinion utilized in the automatic version.

FIG. 5 shows a mounting, in the automatic version, of the intermediate pinion 22. In this figure, the intermediate pinion no longer has two sets of teeth, but has one double-width set of teeth. This embodiment has the disadvantage of only permitting a limited variation of the gear ratio between output pinion 27 and gear crown 6.

Figure 6:
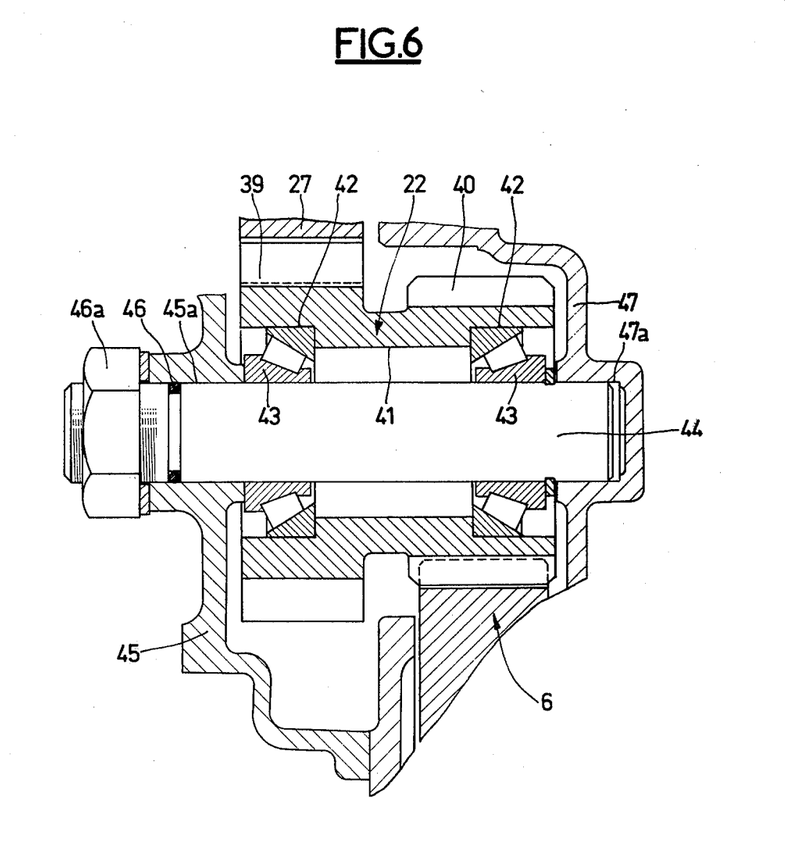
FIG. 6 shows a sectional view of another mounting of the intermediate pinion.

FIG. 6 shows another embodiment of the intermediate double pinion 22. This double pinion 22 forms part of the gear train placed between the exit of the automatic gearbox, shown in FIGS. 3 and 4, and the crown 6 of the differential 3. For this purpose, the intermediate double pinion 22 comprises a first toothed part 39 meshing with the output pinion 27 of the automatic gearbox. A second toothed part 40, of smaller diameter than the toothed part 39, meshes with the crown 6 of the differential. The double intermediate pinion 22 has a central bore 41 provided with portions of greater diameter 42 in the neighborhood of the two extremities of the pinion 22, in order to permit the mounting of two tapered roller bearings 43, the rotation axes of which are inclined inwards, the bearings being able to absorb both radial forces and axial forces. The two bearings 43 are mounted on a fixed shaft 44 passing into a bore 45a of the intermediate bearing-support housing 45, with the inter-position of a toroidal sealing joint 46 and tightening by a nut 46a. The fixed shaft 44 is likewise mounted in a mounting formed in the common housing 47 which receives the hydrokinetic torque converter, the motion output pinion, the differential and the differential crown, as mentioned with reference to FIGS. 2 and 4.

Figure 7:
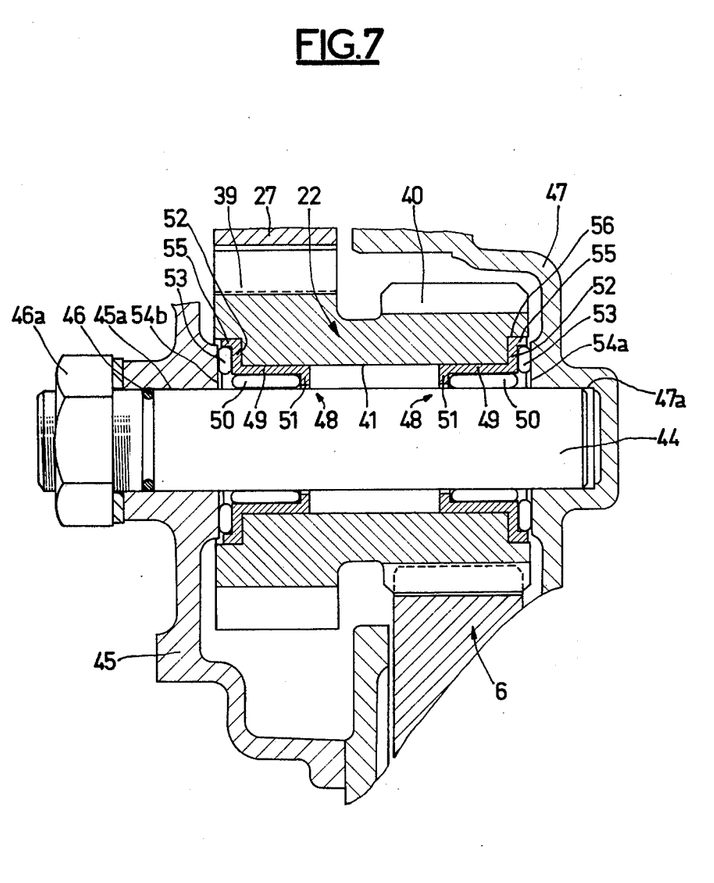
FIG. 7 shows a sectional view of a third mounting of the intermediate pinion.

In the embodiment of FIG. 7, the parts which are identical to those of FIG. 6 bear the same reference numerals. The intermediate double pinion 22 has substantially the same structure as in the embodiment of FIG. 6, but this time is mounted on the fixed shaft 44 by means of two needle bearings 48 which absorb axial and radial thrusts and which are disposed at the two ends of the bore 41. Each needle bearing 48 comprises a cylindrical bushing 49 receiving the needle members 50 which absorb the radial thrusts and roll on the periphery of the fixed axis 44. The needle members 50 are maintained axially aligned by a radial collar 51 directed inwards and integral with the bushing 49. On the other side from the radial collar 51, the cylindrical bushing 49 has an annular radial collar 52, which is directed outwards and which receives needle members 53. The axes of needle members 53 are substantially vertical. Needle members 53 roll on bearing surfaces 54a and 54b, integral respectively with the common housing 47 and with the bearing-support intermediate housing 45. Each annular collar 52 includes an outwardly cylindrical portion 55 which retains the associated needle members 53 and which is positioned in a bore 56 of the intermediate pinion 22. Bore 56 is of greater diameter than is bore 41 which receives the cylindrical bushings 49.

In the two embodiments illustrated in FIGS. 6 and 7, the intermediate double pinion comprises two parts with different sets of teeth. It will of course be understood that in another embodiment the intermediate double pinion could be constituted in the form of a plain pinion of double width; this, however, only permits a limited variation of the gear ratio between the output pinion 27 and the toothed crown 6.

Figure 8:
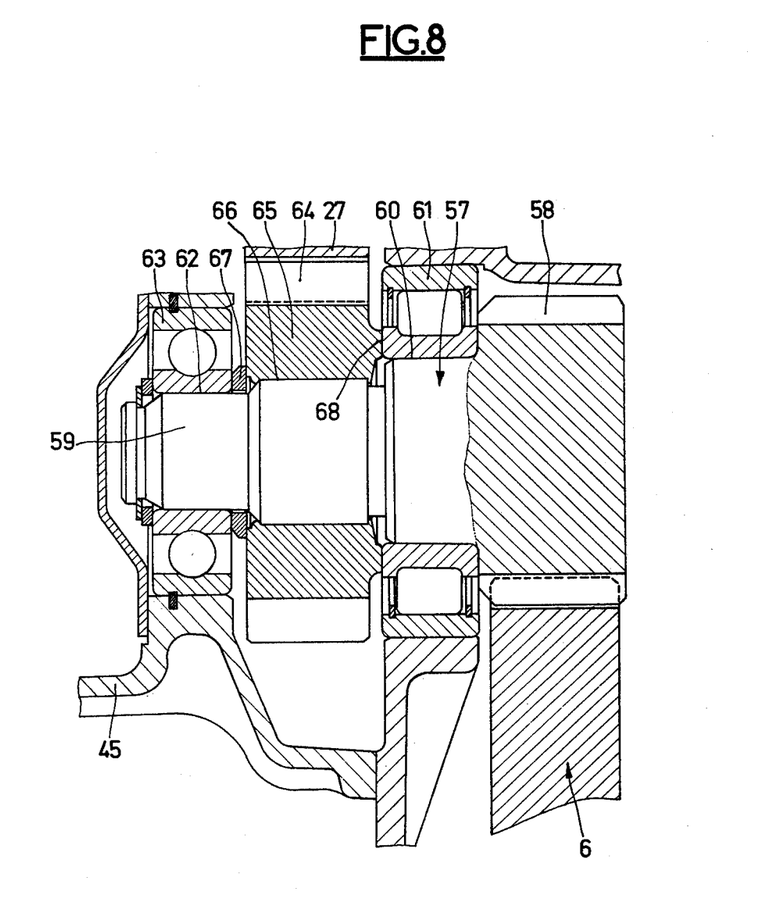
FIG. 8 shows a sectional view of a fourth mounting of the intermediate pinion.

In the embodiment illustrated in FIG. 8, the intermediate double pinion bearing 57 includes an external set of teeth 58 which mesh with the crown 6 of the differential. This external set of teeth 58 is cut at the end of a shaft 59 which is driven in rotation during the operation of the device. The shaft 59 has a shoulder 60 for mounting a roller bearing assembly 61 having cylindrical rollers, and also a shoulder 62, of smaller diameter than the shoulder 60, for mounting a ball bearing assembly 63. The two bearing assemblies 61 and 63 are located on the same side of the external set of teeth 58, the mounting of which is thus in an overhung manner, permitting, in comparison with the embodiments of the previous figures, the double intermediate pinion 57 to be brought close to the hydrokinetic converter of the transmission, and at the same time permitting the crown 6 of the differential to be brought closer to the engine.

The intermediate double pinion 57 is completed by a set of teeth 64 cut on a pinion 65 mounted on a shoulder 66 of the shaft 59. Shoulder 66 is of diameter intermediate between those of the shoulders 60 and 62 and is located between the shoulders 60 and 62. The part 66 of the shaft 59 is splined, or includes any other analogous means enabling the shaft 59 to be rendered integral in rotation with the pinion 65. In this manner, the pinion 65 and its set of teeth 64, located between the bearing assemblies 61 and 63, is driven in rotation like the overhung external teeth 58 at the outside of the said bearings.

The mounting of the different elements is completed by a spacing washer 67, disposed between the ball bearing 63 and the pinion 65, and a bearing surface 68, which is slightly projecting to insure separation of the set of teeth 64 and the roller bearing assembly 61.

Figure 8A:
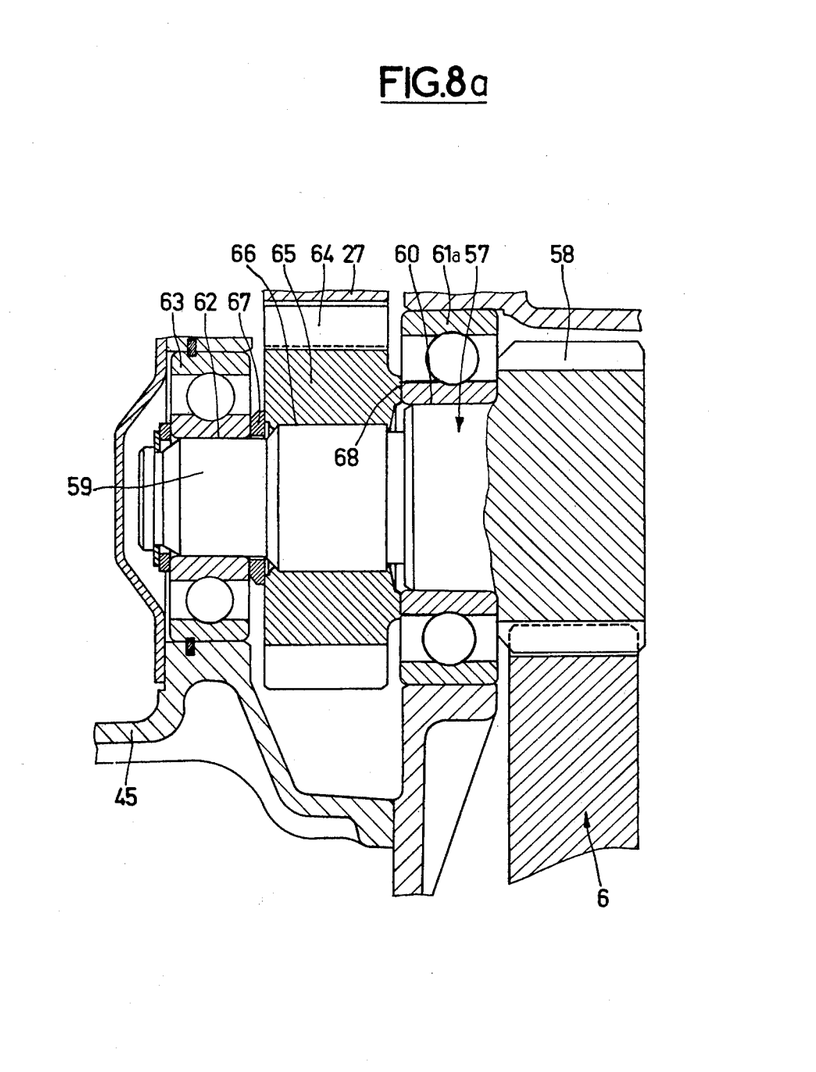
FIG. 8a shows a sectional view of a fifth mounting of the intermediate pinion.

In a variant shown in FIG. 8a, it is possible to replace the roller bearing assembly 61 by a high-load ball bearing 61a.

All the embodiments shown, according to the invention, permit the positions of the shafts 4 and 5 to be identical and the positions of the differential shafts 35 and 36 to be identical. These positions are referenced (FIGS. 1, 2, 3, 4, 5) in relation to the motor coupling face and to the motor axis. Thus, the distance A between the intermediate axis YY' and the motor axis XX', the distance B between the axis ZZ' of the differential shafts 35 and 36 and the intermediate axis YY', and the distance C between the axis ZZ' and the axis XX' are identical in all the embodiments.

Finally, the differential 3 is the same for all the embodiments, and the differential crown 6 can advantageously be the same.

Although the present invention has been described with reference to preferred embodiments, numerous modifications and rearrangements could be made, and still the result would be within the scope of the invention.

What is claimed is:

1. A housing for a transmission which includes a gearbox, coupling means and a differential with a crown gear and shaft, said housing including a plurality of bearing support means, a first said bearing support means located and configured to receive interchangeably the following components:

I. a bearing member for an input shaft of an automatic gearbox, a reaction support means of a hydrokinetic torque converter (FIG. 2) and a sealing member therefor, and II. a bearing member for a primary shaft of a manual-shift gearbox together with a sealing member therefor and a support means for a clutch release bearing assembly;

a second said bearing support means being located and configured to support interchangeably the following components:

III. one end of an intermediate pinion means coupling said automatic gearbox with said crown gear of the differential, and IV. an end pinion of a secondary shaft of said manual-shift gearbox coupling said gearbox with said crown gear of the differential;

third and fourth said bearing support means, each being located and configured to receive bearings for supporting the crown gear for rotation, whereby said housing may be used for a manual shift gearbox together with a mechanical clutch as well as for an automatic gearbox with a hydrokinetic torque converter.

2. A transmission according to claim 1, characterized by the fact that the common housing is in two parts, joined in a plane passing through the axis of the differential.

3. A transmission according to claim 2, characterized by the fact that the common housing includes a front face adapted for attachment to a motor of a vehicle with the front face perpendicular to a shaft of said motor, and a rear face opposed and parallel to the said front face and adapted for attachment directly to a housing of a manual-shift gearbox or directly to a bearing-support housing, and to an automatic gearbox housing.

4. A transmission according to claim 3, characterized by the fact that the positions of the transmission shafts, in relation to the motor axis and the front face, are identical in the automatic version and in the manual-shift version.

5. A transmission according to claim 1, characterized by the fact that the housing includes a fixed shaft for mounting, in the automatic version, a intermediate double pinion which meshes on the one hand with the motion output pinion of a automatic gearbox and on the other hand with a crown gear of the differential, and two combined needle bearings for axial and radial loads, disposed at the two ends of the said intermediate pinion.

6. A transmission according to claim 5, characterized by the fact that each needle bearing comprises a cylindrical bushing for the needles taking up the radial thrusts, and an external annular collar for the needles taking up the axial thrusts and in contact with a bearing surface integral with the housing.

7. A transmission according to claim 5, characterized by the fact that the intermediate double pinion comprises a central bore for mounting the pinion on the fixed shaft by means of the bearings.

8. A transmission according to claim 1, characterized by the fact that the intermediate double pinion meshing on the one hand with the motion output pinion of the automatic gearbox and on the other hand with the crown gear of the differential, comprises an external set of teeth mounted in an overhung manner, meshing with the crown gear of the differential, and an internal set of teeth mounted on a shaft integral with the external set of teeth and between two anti-friction bearings.

9. A transmission according to claim 8, characterized by the fact that the internal set of teeth is cut on a pinion which has a bore and is rendered integral in rotation with the shaft carrying the external set of teeth.

10. A transmission according to claim 8, characterized by the fact that the anti-friction bearings include a ball bearing and a roller bearing with cylindrical rollers.

11. A transmission according to claim 8, characterized by the fact that the anti-friction bearings include two ball bearings.

12. The housing of claim 1 which includes a chamber on one side for interchangeably receiving a hydrokinetic torque converter and a mechanical clutch, said chamber being limited by a partition means separating said chamber on one side of said housing from the other side of said housing adapted to receive said gearbox and said differential.

13. The housing of claim 1 which includes a front face configured for direct attachment to a motor of a vehicle with the front face perpendicular to a shaft of said motor, and a rear face opposed and substantially parallel to the said front face configured for attachment to either of the following:

V. an interposed bearing support housing secured to a housing of said automatic gearbox, or VI. direct to a housing of said manual-shift gearbox.

14. The housing of claim 1 in combination with the components listed in I and III to form an automatic transmission.

15. The apparatus of claim 14 in combination with a vehicle, said bearing support portions having their axes oriented transversely to the longitudinal axis of the vehicle.

16. The housing of claim 1 in combination with the components listed in II and IV to form a manual transmission.

17. The apparatus of claim 16 in combination with a vehicle, said bearing support portions having their axes oriented transversely to the longitudinal axis of the vehicle.

18. A transmission unit for coupling an engine to wheels of a vehicle through an automatic gearbox which has an input shaft and an output shaft, said transmission comprising a differential having a shaft and a crown gear, pinion means including an intermediate pinion with two different meshing portions for coupling the crown gear to an output shaft of said gearbox, a hydrokinetic torque converter which has a reaction support means, a main housing for enclosing said differential and torque converter, said housing being capable of supporting a manual-shift gearbox which has a primary shaft and a secondary shaft provided with an end pinion, a clutch release bearing assembly and a support therefor; said housing having a front face connectible to said engine of the vehicle, and main housing comprising:

a first bearing support means receiving a bearing member for the input shaft of said automatic gearbox and the reaction support means of said torque converter, said first bearing support means being located and configured to receive alternatively a bearing member for a primary shaft of a manual-shaft gearbox together with a sealing member therefor and a support means for a clutch release bearing assembly;

a second bearing support means receiving a bearing member supporting one end of said intermediate pinion, said second bearing support means being located and configured to receive alternatively one end pinion of a secondary shaft of a manual-shift gearbox;

third and fourth bearing support means for supporting the crown gear for rotation;

a bearing support housing attached to a rear face of the main housing and comprising:

a first bearing support means receiving a bearing member for the input shaft of said automatic gearbox;

a second bearing support means receiving a bearing member for another end of said intermediate pinion.

19. A transmission unit as claimed in claim 18 in which the main housing is of a one-piece construction.

20. A transmission unit as claimed in claim 18 in which the housing includes a first housing member, and a second housing member engaging the first housing member in a plane passing through the differential axis.

21. A transmission unit as claimed in claim 18 in which said pinion means includes a two-part pinion, each part having a set of teeth different from the set of teeth of the other part.

22. A transmission unit as claimed in claim 18 in which the pinion means include a double pinion, a fixed shaft integral with the housing, and first and second bearing members disposed at the two ends of the double pinion and mounting the double pinion on the second bearing support means of the main housing.

23. A transmission unit as claimed in claim 22 in which the first and second bearing members are first and second tapered roller bearings.

24. A transmission unit as claimed in claim 18 in which the bearing members for the intermediate pinion include needle bearings, each having a plurality of needle members, a cylindrical bushing for those needle members taking up radial thrusts, and an external annular collar for those needle members taking up axial thrust.

25. A transmission unit as claimed in claim 24 in which the second bearing support means of the main housing includes a fixed shaft integral with the housing, and the intermediate pinion is a double pinion mounted on the fixed shaft by means of the needle bearings.

26. A transmission unit as claimed in claim 18 in which said intermediate pinion is a double pinion having an external set of teeth mounted in an overhung manner and meshing with the differential crown gear, a shaft integral with the external set of teeth and a second set of teeth mounted on the shaft.

27. A transmission unit as claimed in claim 26 in which the second set of teeth is cut on a pinion which has a bore and rotates integrally with the shaft carrying the external set of teeth.

28. A transmission unit as claimed in claim 26 in which the shaft is supported on anti-friction bearings which comprise a ball bearing assembly and a roller bearing assembly with cylindrical rollers.

29. A transmission unit as claimed in claim 26 in which the shaft is supported on anti-friction bearings which comprise two ball bearing assemblies.

30. A transmission unit as claimed in claim 18 in which the housing further comprises a wall portion separating the torque converter from the remainder of the components in a sealed manner.

* * * * *